US005185217A

United States Patent [19]

Miyamoto et al.

[11] Patent Number: 5,185,217

[45] Date of Patent: Feb. 9, 1993

[54] RELATIVELY DISPLACING APPARATUS

[75] Inventors: Noritaka Miyamoto, Toyota; Takashi Tomoda, Nagoya, both of Japan

[73] Assignee: Toyota Jidosha Kabushiki Kaisha, Japan

[21] Appl. No.: 578,650

[22] Filed: Sep. 7, 1990

[30] Foreign Application Priority Data

Sep. 8, 1989 [JP] Japan .............................. 1-233845
Nov. 10, 1989 [JP] Japan .............................. 1-293077

[51] Int. Cl.$^5$ ...................... B32B 15/04; F01D 11/08

[52] U.S. Cl. .................................. 428/627; 428/632; 428/633; 428/937; 277/53; 277/96.2; 415/173.4; 415/200; 417/407

[58] Field of Search ................ 415/173.4, 174.4, 200, 415/170.1; 417/407; 277/53, 96.2, DIG. 6; 428/627, 632, 633, 937

[56] References Cited

U.S. PATENT DOCUMENTS

| | | | |
|---|---|---|---|
| 3,053,694 | 9/1962 | Daunt et al. . | |
| 3,078,232 | 2/1963 | Wentorf, Jr. | 428/627 |
| 3,084,064 | 4/1963 | Cowden et al. . | |
| 3,879,831 | 4/1975 | Rigney et al. . | |
| 4,269,903 | 5/1981 | Clingman et al. . | |
| 4,328,285 | 5/1982 | Siemers et al. | 428/633 |
| 4,405,284 | 9/1983 | Albrecht et al. . | |

FOREIGN PATENT DOCUMENTS

| | | | |
|---|---|---|---|
| 0166097 | 2/1986 | European Pat. Off. . | |
| 0187612 | 7/1986 | European Pat. Off. . | |
| 2256125 | 7/1975 | France . | |
| 2436882 | 7/1980 | France . | |
| 18085 | 5/1974 | Japan . | |
| 690 | 1/1975 | Japan . | |
| 2067160 | 3/1987 | Japan | 428/633 |
| 168926 | 7/1987 | Japan . | |
| 1528421 | 10/1978 | United Kingdom . | |

OTHER PUBLICATIONS

Japanese Patent Abstract, vol. 13, No. 380 (M-863) (3728) dated Aug. 23, 1989, of JP-A-01 134004, dated May 26, 1989.

Journal of Aircraft, vol. 16, No. 4, Apr., 1979, pp. 239-246, C. M. Taylor and R. C. Bill, "Thermal Stresses in a Plasma-Sprayed Ceramic Gas Path Steel".

*Primary Examiner*—Edward K. Look
*Assistant Examiner*—Christopher M. Verdier
*Attorney, Agent, or Firm*—Finnegan, Henderson, Farabow, Garrett & Dunner

[57] ABSTRACT

A relatively displacing apparatus including a movable member and a stationary member which has a coating layer disposed adjacent to the movable member, formed by flame spray coating and including at least one selected from the group consisting of hexagonal system boron nitride and ceric oxide. Since the coating layer is easily machined with the movable member, the coating layer comes to have a surface generated by machining with the movable member and the clearance between the movable member and the stationary member is made zero (0) substantially when the movable member and the stationary member displace relatively at a high temperature. Thus, the efficiency of the relatively displacing apparatus has improved. In addition, since the coating layer has a high thermal shock resistance, the durability of the relatively displacing apparatus has improved.

12 Claims, 17 Drawing Sheets

RELATIVELY DISPLACING APPARATUS

BACKGROUND OF THE INVENTION

1. Field of the Invention

The present invention relates to a relatively displacing apparatus, such as a turbocharger, a gas turbine and the like, which comprises a movable member and a stationary member disposed adjacent to each other and displacing relatively at a high temperature. In particular, the present invention relates to a relatively displacing apparatus which enables to make a clearance between the movable member and the stationary member zero (0) substantially during the operation thereof.

2. Description of the Prior Art

A conventional relatively displacing apparatus will be hereinafter described with reference to an automotive turbocharger illustrated in FIG. 24. This turbocharger has a turborotor 100 and an impeller 200 as a movable member, and a turbohousing 101 and a compressor housing 201 as a stationary member. In the operation of the turbocharger, the turborotor 100 is rotated by the energy of the exhaust gas of an engine (not shown), a shaft 300 is then rotated, and the impeller 200 is rotated by the rotation of the shaft 300, whereby air is supercharged into the engine. In this way, the turborotor 100 and the turbohousing 101 as well as the impeller 200 and the compressor housing 201 are disposed adjacent to each other and displaced relatively at a high temperature during the operation of the turbocharger.

Here, it has been known that the efficiency of the turbocharger can be improved by making a clearance C100 between the turborotor 100 and the turbohousing 101 and a clearance C200 between the impeller 200 and the compressor housing 201 as small as possible. In the case that the clearances C100 and C200 are reduced, however, there is a possibility of damaging the turborotor 100 and the impeller 200 since the eccentricity and so on occurred during the manufacture of the shaft 300 results in the contact or collision of the turborotor 100 with the turbohousing 101 and the contact or collision of the impeller 200 with the compressor housing 201.

Accordingly, in the conventional turbocharger, it is necessary to set the clearance C100 between the turborotor 100 and the turbohousing 101 at approximately 0.6 to 0.8 mm and to set the clearance C200 between the impeller 200 and the compressor 201 at approximately 0.3 to 0.5 mm. The conventional turbocharger thus has insufficient efficiency. Therefore, it has been desired to develop a technology which can improve the efficiency of the conventional relatively displacing apparatus by making the clearance between the movable member and the stationary member as small as possible and which can avoid the damage to movable member.

A technology has been disclosed so far in which a coating layer composed of a mixture of soft metal and resin or graphite is formed on the compressor housing 201 by flame spray coating. In the conventional technology, the formed coating layer is easily machined off by the contact of the impeller 200 with the compressor housing 201 resulting from the eccentricity and so on of the shaft 300. Whereby it is possible to make the clearance C200 between the impeller 200 and the machined compressor housing 201 zero (0) substantially. Here, the impeller 200 is not damaged by the operation. The technologies disclosed in Japanese Unexamined Patent Publication (KOKAI) No. 18085/1974 and U.S. Pat. No. 4,405,284 are included in the category of the technology which utilizes the machinability of the coating layer in order to make the clearance between a movable member and the stationary member zero (0) substantially. These publications disclose technologies of an Ni-graphite coating and an NiCrFeAl-BN coating.

Further, U.S. Pat. No. 4,269,903 discloses an invention relating to a ceramic seal. The publication discloses a technology for coating a porous stabilized zirconium oxide layer having a porosity of 20 to 33%. This technology is basically identical with the above-mentioned technology. According to this technology, it is also possible to make the clearance between the movable member and the stationary member zero (0) substantially by utilizing the machinability of the porous stabilized zirconium oxide layer.

However, even when the relatively displacing apparatus is manufactured by the above-mentioned technologies, there arises the following problems in the relatively displacing apparatus manufactured.

Namely, the technology disclosed in the U.S. Pat. No. 4,269,903 utilizes the zirconium oxide, which is resistant to thermal shock, as the coating layer in view of the high temperature application. The zirconium oxide is made porous in order to secure the machinability of the coating layer. However, since the coating layer having the porosity of 20 to 33% is formed by flame spray coating the zirconium oxide only and since the zirconium oxide having a high hardness of Hv 1000 or more is contained therein according to the technology, the movable member, i.e., a mating member of the coating layer, is likely to be worn by the coating layer. Further, when a coating layer having a porosity of 33% or more, for instance a coating layer having a porosity of 40% is formed in order to improve the machinability, the thermal shock resistance of the coating layer deteriorates and the coating layer comes off or falls off accordingly.

Further, since the coating layer is metallic in the technologies disclosed in the Japanese Unexamined Patent Publication (KOKAI) No. 18085/1974 and the U.S. Pat. No. 4,405,284, it is impossible to endure a severe application condition, for instance the application condition of an aircraft engine or a gas turbine engine, i.e., a high temperature of approximately 1000° C. at maximum for a long period of time. The coating layer is eventually oxidized and corroded, and it should be repaired accordingly.

In addition to the above-mentioned technologies, Japanese Examined Patent Publication (KOKOKU) No. 690/1975 discloses an invention relating to a gas turbine engine. The publication does not disclose the technology utilizing the machinability of the coating layer, but discloses a technology for avoiding the damage to a turbine blade in which a turbine casing is molded and sintered with a soft ceramic material being softer than a material for forming the turbine blade. However, since the force for binding the ceramic materials is weak, the gas turbine engine manufactured by the technology lacks the durability.

Moreover, Japanese Unexamined Patent Publication No. 168926/1987 discloses a technology for optimizing the clearance between the turborotor 100 and the turbohousing 101 or the clearance between the impeller 200 and the compressor housing 201 in which the inner surface of the turbohousing 101 or the compressor housing 201 is coated with a composite material. However, the publication does not disclose the quality of the coating layer material at all.

SUMMARY OF THE INVENTION

The present invention has been developed in view of the problems of the above-mentioned technologies. It is therefore an object of the present invention to provide a relatively displacing apparatus having a coating layer of a favorable machinability even in a high temperature application.

A relatively displacing apparatus according to the present invention comprises: a movable member; and a stationary member; the movable member and the stationary member disposed adjacent to each other and displacing relatively at a high temperature. The stationary member has a coating layer disposed adjacent to the movable member. The coating layer is formed by flame spray coating, and includes at least one selected from the group consisting of hexagonal system boron nitride and ceric oxide (or ceria, $CeO_2$), and has a surface generated by machining with the movable member.

The relatively displacing apparatus according to the present invention is a turbocharger or a gas turbine for an automobile or an aircraft. The relatively displacing apparatus comprises the movable member and the stationary member which are disposed adjacent to each other and which displace relatively at a high temperature. For instance, let a turbocharger be the relatively displacing apparatus, an impeller and a turborotor correspond to the movable member, and a compressor housing and a turbohousing correspond to the stationary member. Likewise, let a gas turbine be the relatively displacing apparatus, a turbine blade corresponds to the movable member, and a turbine casing corresponds to the stationary member. In addition, the relative displacement between the movable member and the stationary member may be either rotary displacement or linear displacement.

The stationary member has the coating layer disposed adjacent to the movable member. The coating layer is formed of an abradable material including at least one selected from the group consisting of hexagonal system boron nitride and ceric oxide, and it is formed by flame spray coating. The abradable material may include the hexagonal system boron nitride by 5 to 45% by volume and oxide by 55 to 95% by volume, or the abradable material may include at least the ceric oxide by 10% or more by volume.

As for the boron nitride, the hexagonal system boron nitride, not cubic system boron nitride, is employed in order to effect the advantages of the present invention. This is because the cubic system boron nitride is hard and the hexagonal system boron nitride is soft. It is preferred to employ the abradable material including the hexagonal system boron nitride (hereinafter simply referred to as "BN") by 5 to 45% by volume in order to effect the advantages of the present invention. When the BN is included therein by less than 5% by volume, the machinability of the coating layer is not improved sufficiently. When the BN is included therein by more than 45% by volume, the machinability of the coating layer is improved excessively and the thermal shock resistance deteriorates, thereby causing the coating layer more likely to come off or fall off. Moreover, the average particle size of the BN is preferred to fall in a range of 5 to 50 μm in view of practicability.

Further, oxide may be included in the abradable material together with the BN. As for the oxide, the following ceramic powder may be employed: zirconium oxide ($ZrO_2$) powder, yttrium oxide ($Y_2O_3$) powder, aluminum oxide ($Al_2O_3$) powder and the like. Moreover, the average particle size of the oxide is preferred to fall in a range of 10 to 100 μm in view of practicability.

As aforementioned, the abradable material may include at least the ceric oxide by 10% or more by volume. When the ceric oxide is included therein by less than 10% by volume, the machinability of the coating layer is not improved sufficiently. The more the ceric oxide is included therein by volume, the more the machinability is improved. The reason will be hereinafter described why the ceric oxide is extremely appropriate for the abradable material for adjusting the clearance in the relatively displacing apparatus. Table 1 sets forth major oxides and their Mohs scales and thermal expansion coefficients. It is apparent from Table 1 that the ceric oxide is softer than most of the other oxides and has a thermal expansion coefficient substantially equal to that of metal. The latter property is favorable one for a component part used at a high temperature of 800° to 1000° C. However, among the major oxides, calcium oxide (CaO), barium oxide. (BaO) and strontium oxide (SrO) have favorable Mohs scales, but they are not appropriate oxides to be included in the abradable material because they react with moisture content in atmosphere to generate hydroxides. Moreover, the average particle size of the ceric oxide is preferred to fall in a range of 10 to 100 μm in view of practicability.

TABLE 1

| Oxides | Mohs Scale | Thermal Expansion Coefficient ($\times 10^{-6}$, °C.$^{-1}$) Room Temperature to 800° C. |
|---|---|---|
| $Al_2O_3$ | 12 | 7 |
| $Cr_2O_3$ | 12 | 9 |
| $ZrO_2.5CaO$ | 7 | 12 |
| $ZrO_2.20Y_2O_3$ | 8 | 12 |
| $ZrO_2.SiO_2$ | 9 | 6 |
| BeO | 9 | 8 |
| $TiO_2$ | 8 | 10 |
| CaO | 5 | 10 |
| BaO | 3.5 | 10 |
| SrO | 3.5 | 10 |
| $MgO.Al_2O_3$ | 8 | 7 |
| $3Al_2O_3.2SiO_2$ | 8 | 6 |
| $SiO_2$ | 7 | 6 |
| $CeO_2$ | 4.5 | 12 |

Further, the following powder may be included in the abradable material together with the ceric oxide: oxide powder such as aluminum oxide ($Al_2O_3$) powder, zirconium oxide ($ZrO_2$) powder and yttrium oxide ($Y_2O_3$) powder, the BN powder, graphite powder, mica powder and the like. The BN powder, the graphite powder and the mica powder work as an auxiliary powder for improving the machinability of the coating layer. For instance, when the BN powder is included in the coating layer, the machinability is further improved by the laminated structure of the BN. Here, the average particle size of the oxide powder is preferred to fall in a range of 10 to 100 μm, and the average particle size of the BN powder, the graphite powder, the mica powder and the like falls in a range of 5 to 50 μm in view of practicability.

As for the flame spray coating, plasma jet flame spray coating, gas flame spray coating and the like may be employed.

The coating layer has the generated surface. The generated surface is machined and generated by the movable member during the operation of the relatively displacing apparatus.

The relatively displacing apparatus according to the present invention comprises the stationary member having the coating layer disposed adjacent to the movable member, and the coating layer includes at least one selected from the group consisting of the BN and the ceric oxide. In the case that the coating layer includes the BN as well as the above-mentioned oxide, the coating layer has a structure, which results from the property of the BN, as schematically illustrated in FIG. 17. In the structure of the coating layer, the BN particles 52 are present on the boundaries of the oxide particles 51 in a laminated structure, and the pores 53 are also present on the boundaries of the oxide particles 51 and the BN particles 52. Here, the stationary member is designated at 61 in FIG. 17.

As schematically illustrated in FIG. 18, the inventors of the present invention consider that there are four mechanisms in which the coating layer having the above-mentioned structure is machined by the movable member 62 displacing relatively with respect to the stationary member 61.

(a) Shear fracture of the oxide particles 51 (designated at "a-1")

(b) Falling off of the oxide particles 51 disposed on the boundaries of the pores 53 (designated at "a-2")

(c) Falling off of the oxide particles 52 disposed on the boundaries of the BN particles 52 (designated at "a-3")

(d) Shear fracture of the BN particles 52 (designated at "a-4")

On the other hand, as schematically illustrated in FIG. 19, the inventors of the present invention consider that there are two mechanisms in which the conventional coating layer is machined by the movable member 62. The conventional coating layer includes the oxide only and has a structure as schematically illustrated in FIG. 19.

(a) Shear fracture of the oxide particles 51 (designated at "b-1")

(b) Falling off of the oxide particles 51 disposed on the boundaries of the pores 53 (designated at "b-2")

Among the above-mentioned mechanisms, since the oxide particles 51 are extremely hard, for instance, since the zirconium oxide has a hardness of Hv 1000 or more, it is believed that a large force is required to cause the shear fracture of the oxide particles 52 ("a-1" and "b-1").

On the contrary, since the BN particles 52 are soft, namely they have a hardness of approximately Hv 3, and since they are thus softer than the oxide particles 51, it is believed that a small force is required to cause the shear fracture of the BN particles 52 ("a-4").

In addition, since the oxide particles 51 are bound by a small force exerted by the BN particles 52 having a low wettability, it is also believed that a small force is needed to complete the falling off of the oxide particles 51 ("a-3") disposed on the boundaries of the BN powder particles 52.

Finally, since the pores 53 are present on the boundaries of the oxide particles 51 and since the oxide particles 51 are adhered by a weak adhesion force, it is believed that an intermediate force is required to cause the falling off of the oxide particles 51 ("a-2" and "b-2") disposed on the boundaries of the pores 53.

Therefore, according to the relatively displacing apparatus of the present invention, no large force is required to machine the coating layer and consequently it is possible to carry out the machining by the small forces or the intermediate force.

Moreover, in the case that the coating layer includes the ceric oxide as well as the auxiliary powder for improving the machinabilitiy such as the BN powder, the graphite powder or the like, the coating layer also has the structure as schematically illustrated in FIG. 17. In the structure of the coating layer, the auxiliary powder particles 52 are present on the boundaries of the oxide particles 51, i.e., the ceric oxide particles, in a laminated structure, and the pores 53 are also present on the boundaries of the oxide particles 51 and the auxiliary powder particles 52.

The inventors of the present invention believes that the above-mentioned four mechanisms are also applicable to the machining of the coating layer having such a structure. Namely, since the pores 53 are present on the boundaries of the oxide particles 51 and since the oxide particles 51 are adhered by a weak adhesion force, it is believed that an intermediate force is required to cause the falling off of the oxide particles 51 ("a-2") disposed on the boundaries of the pores 53. Further, since the oxide particles 51 are bound by a small force exerted by the auxiliary powder particles 52 having a low wettability, it is also believed that a small force is needed to complete the falling off of the oxide particles 51 ("a-3") disposed on the boundaries of the auxiliary powder particles 52.

Accordingly, the machinability of the coating layer is mostly governed by the forces required for causing the shear fracture of the oxide particles 51 ("a-1") and the shear fracture of the auxiliary powder particles 52 ("a-4"). In the case that the other conditions are identical, the coating layer becomes to be easily machinable when the forces required for causing the shear fractures ("a-1" and "a-4") are small. Here, the force required for causing the shear fracture of the oxide particles 51 is believed to be in proportion to the hardness of the oxide particles 51 themselves. Therefore, since the soft ceric oxide particles are included as the oxide particles 51 in the coating layer, it is believed that a small force is only needed to machine the coating layer.

In the relatively displacing apparatus of the present invention, the coating layer is thus machined easily without causing the damage to the movable member, thereby generating the generated layer. Since the clearance between the movable member and the stationary member is made zero (0) substantially by the generated surface, the gas leakage and the like has been prevented from happening and the efficiency of the displacing apparatus has been improved.

Additionally, in the relatively displacing apparatus of the present invention, the porosity of the coating layer is not increased, nor the coating layer is formed of a metallic abradable material. As a result, the coating layer does not come off, fall off or corrode at a high temperature in the relatively displacing apparatus of the present invention.

Hence, the relatively displacing apparatus of the present invention comprises the movable member being less likely to be damaged and the stationary member having the coating layer being less likely to come off, fall off or corrode even when it is applied to a high temperature for a long period of time, and accordingly the clearance between the movable member and the stationary member can be made zero (0) substantially. The relatively displacing apparatus thus has an excellent efficiency and a long life.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS OF THE INVENTION

Having generally described the present invention, a further understanding can be obtained by reference to certain specific preferred embodiments which are provided herein for purposes of illustration only and are not intended to be limiting unless otherwise specified.

The preferred embodiments are embodied in a turbocharger. They will be hereinafter described together with comparative examples manufactured in comparison therewith.

First Preferred Embodiment

Figure 1:
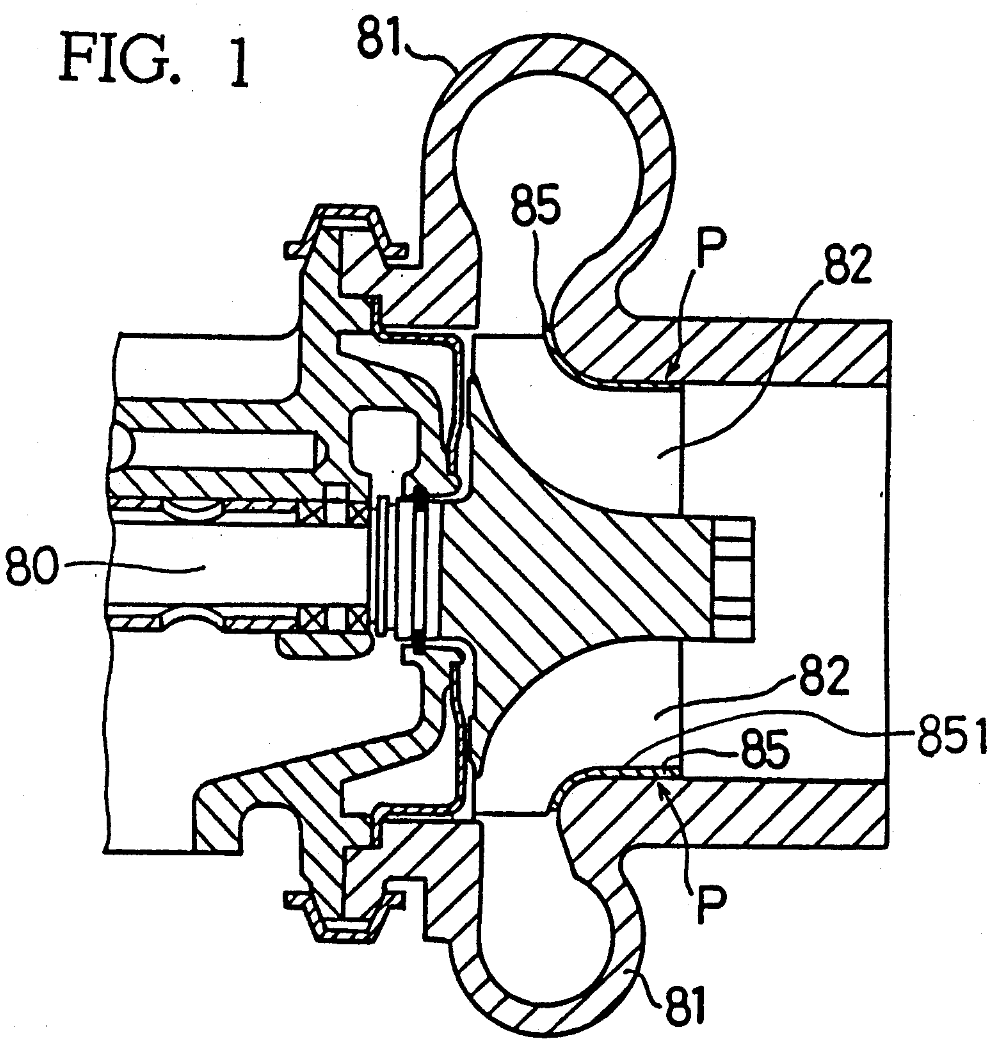
FIG. 1 is a partial cross sectional view of a turbocharger of a preferred embodiment according to the present invention.
Figure 24:
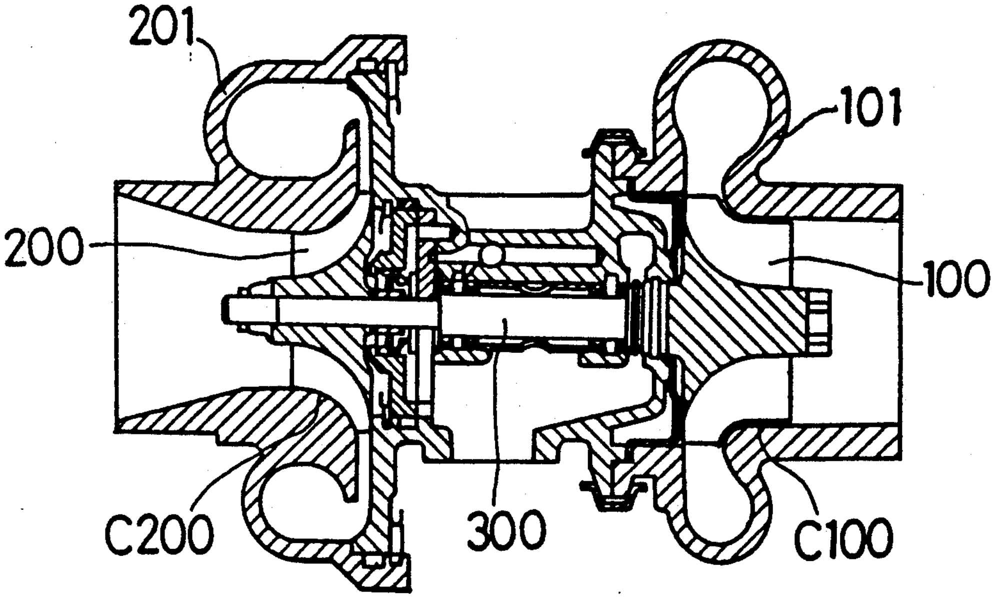
FIG. 24 (Prior Art)
FIG. 24 is a cross sectional view of a conventional turbocharger.

As it is apparent from FIG. 1 illustrating the partial cross sectional view of the turbocharger, the turbocharger is basically identical with the above-mentioned conventional turbocharger (See FIG. 24.). The turbocharger comprises a turbohousing 81 having an inside diameter of 55 mm and a turborotor 82 connected to a shaft 80. In the turbocharger, the turbohousing 81 has a coating layer 85 at a position "P" disposed adjacent to the turborotor 82.

A procedure for manufacturing the turbocharger will be hereinafter described.

Figure 2:
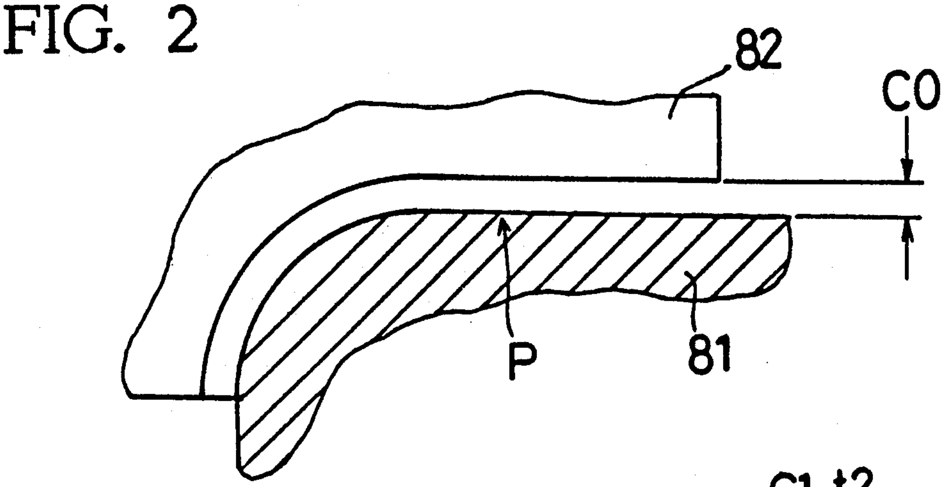
FIG. 2 is an enlarged partial cross sectional view of the turbocharger thereof.
Figure 3:
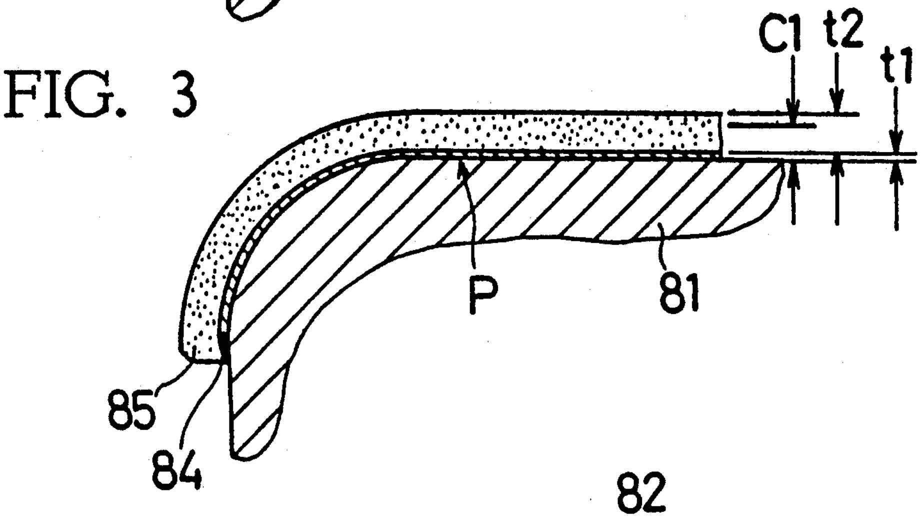
FIG. 3 is another enlarged partial cross sectional view of the turbocharger thereof.

(a) In the turbocharger, as illustrated in FIG. 2, there was a clearance CO of approximately 0.8 mm between the turbohousing 81 and the turborotor 82 before forming the coating layer 85.

(b) A shot blasting treatment was carried out on the portion "P" of the turbohousing 81 adjacent to the turborotor 82 with a calcined aluminum oxide powder having an average particle size of 1200 to 1400 $\mu$m.

(c) An alloy layer 84 was formed as a substrate layer on the shot-blasted portion "P" in a thickness of t1, for instance 0.08 to 0.1 mm, by plasma jet flame spray coating with an NiCrAl (94(80Ni-20Cr)-6Al) alloy in advance. The alloy layer 84 was for improving the adhesion.

(d) A $ZrO_2.8Y_2O_3$ powder ("K90" produced by Showa Denko Co., Ltd.) having an average particle size of 10 to 74 $\mu$m and a hexagonal system BN powder ("UHP-EX" produced by Showa Denko Co., Ltd.) having an average particle size of 35 to 45 $\mu$m were prepared. Then, 60% by volume of the $ZrO_2.8Y_2O_3$ powder and 40% by volume of the BN powder were compounded to make an abradable material.

(e) The abradable material was coated on the portion "P," which had been coated with the alloy layer 84, in a thickness of t2, for instance approximately 1.0 mm, by plasma jet flame spray coating. The coating layer 85 was thus formed.

(f) After forming the coating layer 85, the coating layer 85 was machined by a numerical control machine tool so that there was a clearance C1 of 0.05 mm between the turbohousing 81 and the turborotor 82.

In this way, the turbocharger of the first preferred embodiment was manufactured.

Second Preferred Embodiment

The turbocharger of a second preferred embodiment was identical with that of the first preferred embodiment except that an abradable material was employed which included 65% by volume of an aluminum oxide ($Al_2O_3$) powder and 35% by volume of a BN powder. Here, the aluminum oxide powder ("101B" produced by Metco Co., Ltd.) had the average particle size of 35 to 74 μm, and the BN powder was identical with the one employed in the first preferred embodiment.

Third Preferred Embodiment

The turbocharger of a third preferred embodiment was identical with that of the first preferred embodiment except that an abradable material was employed which included 60% by volume of an aluminum oxide ($Al_2O_3$) powder and 40% by volume of a BN powder. Here, the aluminum oxide powder was identical with the one employed in the second preferred embodiment, and the BN powder was identical with the one employed in the first preferred embodiment.

Comparative Example 11

The turbocharger of comparative example 11 was basically identical with that of the first preferred embodiment except that the alloy layer 84 and the coating layer 85 were not formed on the portion "P" of the turbohousing 81.

Comparative Example 12

The turbocharger of comparative example 12 was identical with that of the first preferred embodiment except that an abradable material was employed which included a $ZrO_2.20Y_2O_3$ powder. Here, the $ZrO_2$-$20Y_2O_3$ powder was produced by Showa Denko Co., Ltd., and had an average particle size of 10 to 44 μm. The coating layer had a porosity of 28%.

Comparative Example 13

The turbocharger of comparative example 13 was identical with that of the first preferred embodiment except that an abradable material was employed which included 75% by weight of nickel (Ni) powder and 25% by weight of a graphite powder. Here, the nickel powder had an average particle size of 10 to 74 μm, and the graphite powder had an average particle size of 10 to 30 μm and was produced by Perkin Elmer Co., Ltd.

Comparative Example 14

The turbocharger of comparative example 14 was identical with that of the first preferred embodiment except that an abradable material was employed which included 94.5% by weight of an NiCrFeAl alloy powder and 5.5% by weight of a BN powder. Here, the NiCrFeAl alloy had the following composition: Cr by 14%, Fe by 8.0%, Al by 3.5%, BN by 5.5% and the balance of Ni, and had an average particle size of 45 to 120 μm. The BN powder was identical with the one employed in the first preferred embodiment.

Product Evaluation

Figure 4:
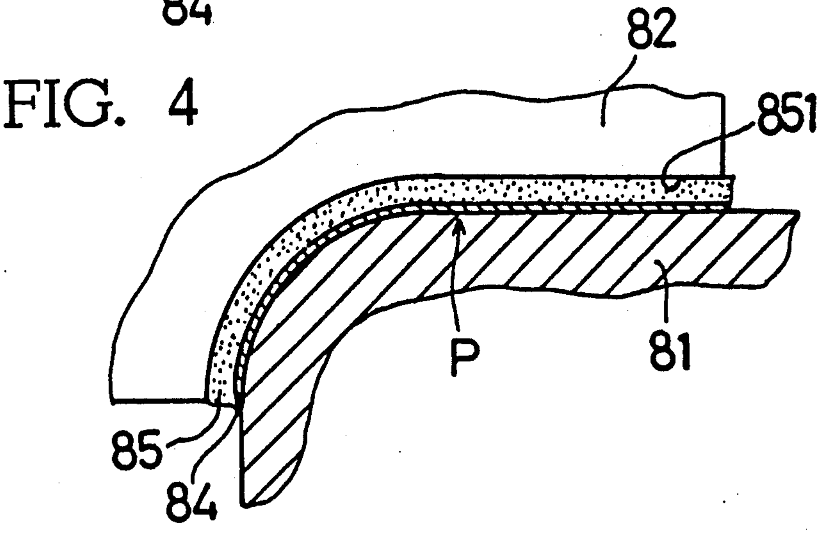
FIG. 4 is a still another enlarged partial cross sectional view of the turbocharger thereof.

In the turbochargers of the first and second preferred embodiment, even in the case that the shaft 80 had an eccentricity and that the turborotor 82 was brought into contact with or collided with the turbohousing 81 during the operation, the coating layer 85 of the turbohousing 81 was easily machined by the turborotor 82, and a generated surface 851 was thereby generated on the coating layer 85 as illustrated in FIG. 4. Accordingly, the turbochargers could prevent the turborotor 82 from being damaged.

Namely, the turbochargers of the first and second preferred embodiment as well as comparative example 11 were subjected to a product performance test for evaluating a total efficiency (%) under condition of the rotor speed of a hundred thousand rpm. The results of the product performance test are set forth in Table 2.

TABLE 2

| Turbocharger | Total Efficiency (%) | Improvement against Comparative Example 11 |
|---|---|---|
| 1st Pref. Embodi. | 56% | Raised by 5% |
| 2nd Pref. Embodi. | 57% | Raised by 6% |
| Com. Ex. 11 | 51% | — |

As set forth in Table 2, the turbochargers of the first and second preferred embodiment had the total efficiency improved by 5 to 6% with respect to that of comparative example 11. The improvement is believed to result from the fact that the generated surface 851 made the clearance between the turbohousing 81 and the turborotor 82 zero (0) substantially as illustrated in FIG. 4 and accordingly the gas leakage could be prevented to a minimum degree.

Further, the turbochargers of the first and third preferred embodiment as well as comparative examples 12, 13 and 14 were subjected to a durability test including a noise test during a 300 hour-operation, a coating layer checking test after the operation and a turborotor checking test after the operation. Additionally, weight reductions (in grams) of the turborotors 82 were measured after the operation. The results of the tests are set forth in Table 3. In accordance with the results of the tests, the turbochargers were rated in a "Total Evaluation" column of Table 3 with either a "Good" sign identifying an excellent turbocharger and a "Bad" sign identifying an inferior turbocharger.

TABLE 3

| Turbocharger | Noise during Oper. | Coating Layer State after Operation | Turborotor State after Operation | | Total Evaluation |
|---|---|---|---|---|---|
| | | | Deform. | Wt. Reduc. | |
| 1st Pref. | None | No Problem | None | None | Good |
| 3rd Pref. | None | No Problem | None | None | Good |
| Com. 12 | Loud | Come-off in Part | Heavy | 4 grams | Bad |
| Com. 13 | Low | Come-off by Corrosion | Light | 4 grams | Bad |
| Com. 14 | Loud | Corrosion and Many Damages | Heavy | 3 grams | Bad |

As set forth in Table 3, the turbochargers of the first and third preferred embodiment did not show any faulty operation. On the other hand, the turbochargers of comparative examples 12, 13 and 14 generated chattering when the turborotors 82 were brought into contact with the turbohousings 81 in the operation because the coating layers were of inferior machinability. As for the state of the coating layer after the operation, the coating layers of the turbochargers of comparative examples 12 and 13 were not machined, but they were come off when the turborotors 82 were brought into contact with the turbohousings 81 in the operation. Moreover, the turbochargers of comparative examples 13 and 14 had corroded coating layers after the operation. Finally, the turbochargers of comparative examples 12, 13 and 14 had deformed turborotors 82 after the operation, and the turborotors 82 thereof exhibited the weight reductions due to wear.

It is thus apparent that the turbochargers of the first, second and third preferred embodiment had the coating layers 85 of favorable machinability. Accordingly, the turborotors 82 could be prevented from being damaged, and the efficiency of the turbochargers could be improved.

Fourth and Fifth Preferred Embodiment

The present invention will be hereinafter described with reference to the results of the following tests carried out on a fourth and fifth preferred embodiment. Here, the fourth and fifth preferred embodiment were coating layers formed on test pieces in accordance with the present invention.

(1) Machinability Test

Abradable materials were prepared whose compositions are set forth in Table 4. Then, test pieces of the fourth and fifth preferred embodiment as well as comparative examples 15 through 20 were prepared with the abradable materials and subjected to a test for comparing their machinabilities.

TABLE 4

| Test Piece | Abradable Material Composition |
|---|---|
| 4th Pref. Embodi. | 60 vol. % $ZrO_2.8Y_2O_3$ + 40 vol. % BN |
| 5th Pref. Embodi. | 60 vol. % $Al_2O_3$ + 40 vol. % BN |
| Com. Ex. 15 | $ZrO_2.8Y_2O_3$ (Porosity: 24%) |
| Com. Ex. 16 | $Al_2O_3$ (Porosity: 22%) |
| Com. Ex. 17 | 60 vol. % $ZrO_2.8Y_2O_3$ + 40 vol. % graphite |
| Com. Ex. 18 | 60 vol. % $Al_2O_3$ + 40 vol. % graphite |
| Com. Ex. 19 | 60 vol. % $ZrO_2.8Y_2O_3$ + 40 vol. % mica |
| Com. Ex. 20 | 60 vol. % $Al_2O_3$ + 40 vol. % mica |

The test pieces were prepared in the following manner: First, the NiCrAl alloy were coated as a substrate layer in a thickness of 0.1 mm on a flat plate (30 mm×30 mm×5 mm) made of S45 (carbon steel as per JIS) by plasma jet flame spray coating. Then, the abradable materials were coated on the substrate layer in a thickness of 1 mm by plasma jet flame spray coating. Here, the $ZrO_2.8Y_2O_3$ powder, the $Al_2O_3$ powder, the BN powder and the graphite powder were identical with those employed by the above-mentioned first and second preferred embodiment and comparative example 13. The mica powder had an average particle diameter of 35 to 45 μm, and was produced by Showa Denko Co., Ltd. In addition, all of the additives other than the $ZrO_2$ and the $Al_2O_3$ had a laminated structure, and they themselves had a property of easily disintegrating. The additives were added in order to make the machinability of the coating layers favorable.

Figure 5:
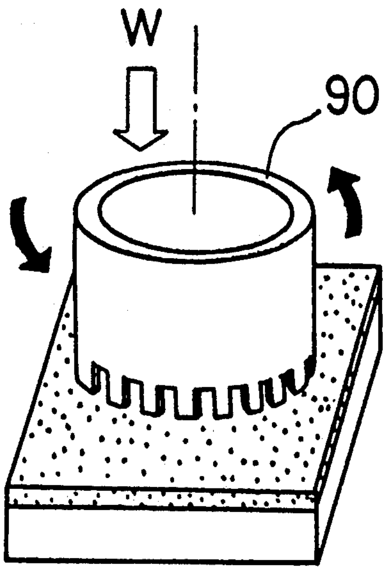
FIG. 5 is a perspective view illustrating how a machinability test is carried out on a test piece having a coating layer formed in accordance with the present invention.

The fourth and fifth preferred embodiment and comparative examples 15 through 20 were subjected to a machinability test for evaluating the machinabilities of their coating layers. The machinability test were carried out as illustrated in FIG. 5. Namely, a ring 90 (10 mm) made of Inconel (Trade Mark), i.e., an identical material for making the turborotor 82, was rotated on the test pieces under the following conditions in the direction of the arrow in FIG. 5:

Load "W": a surface load of 150 gf/mm$^2$

Speed: 1000 rpm

Testing Time: 1 minute

A ring-shaped groove was machined by the ring 90 in the coating layer of the test piece, and the depth was measured and taken as machined depth (in mm). Also, the wear amount of the ring 90 was measured in milligrams and taken as mating part attack tendency. The results of the machinablity test are illustrated in FIG. 6.

Figure 6:
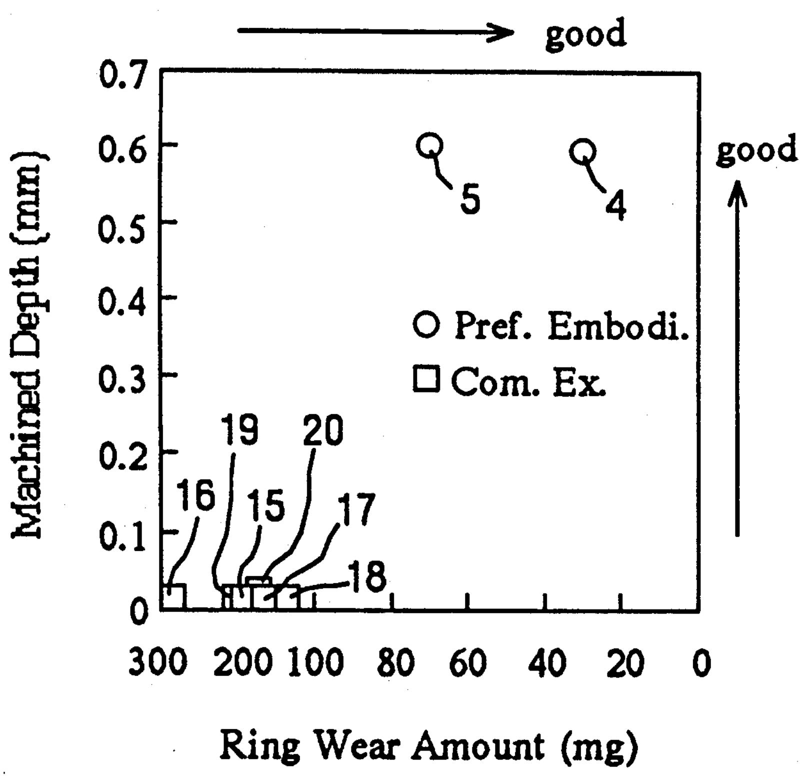
FIG. 6 is a scatter diagram illustrating relationships between wear amounts and machined depths of a fourth and fifth preferred embodiment as well as comparative examples 15 through 20.

It is understood from FIG. 6 that the coating layers including the BN powder and formed on the test pieces of the fourth and fifth preferred embodiment were machined easily and that they were favorable. On the contrary, the coating layers formed on the test pieces of comparative examples 15 through 20, namely the coating layers including the graphite and mica and the coating layers formed of the oxides only, exhibited the machined depth of substantially zero (0) and heavy ring wear amounts, and accordingly they were not favorable.

Figure 7:
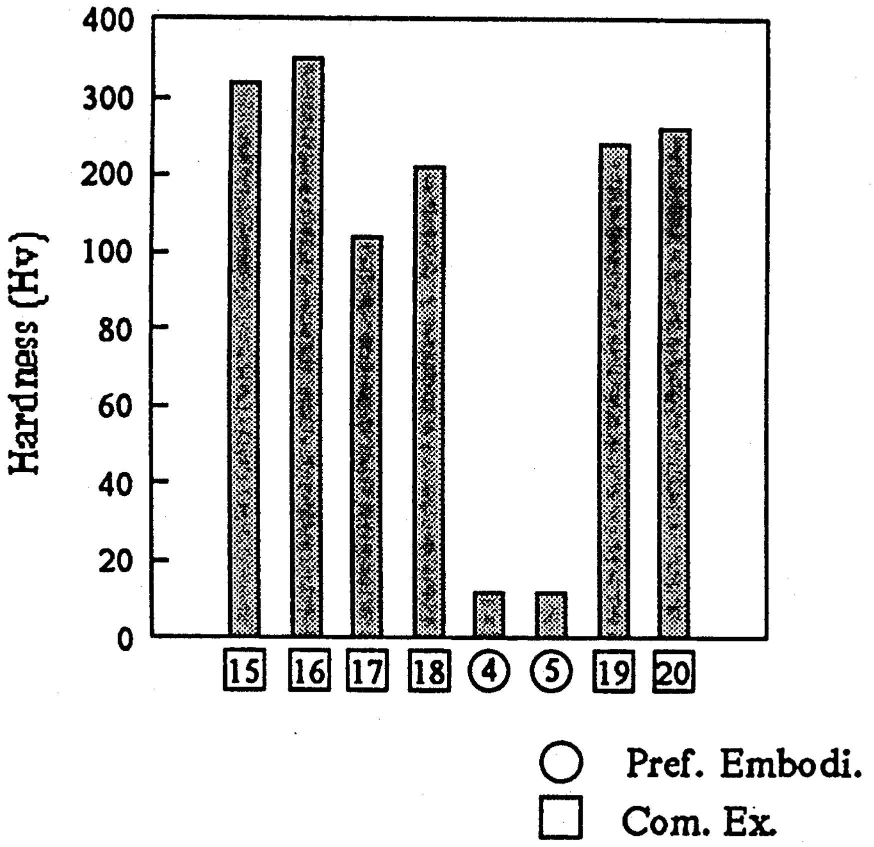
FIG. 7 is a column chart illustrating hardnesses of the fourth and fifth preferred embodiment as well as comparative examples 15 through 20.

In addition, FIG. 7 illustrates the results of a hardness measurement on the hardnesses of the coating layers formed on the test pieces in accordance with the fourth and fifth preferred embodiment and comparative examples 15 through 20. The hardness measurement was carried out to obtain the Vickers hardness under a load of 5 kgf. It is apparent that the coating layers of the fourth and fifth preferred embodiment had extremely low Vickers hardnesses compared with those of the coating layers of comparative examples 15 through 20.

Figure 8:
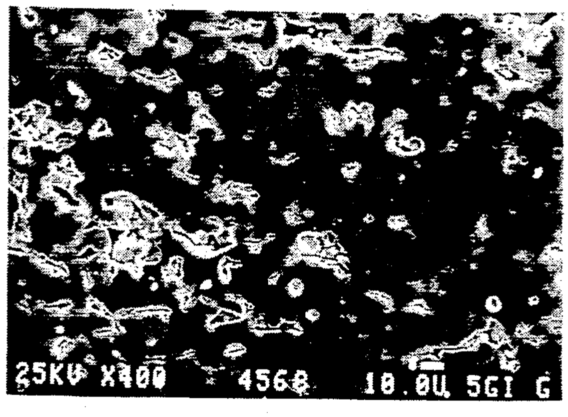
FIG. 8 (Prior Art)
FIG. 8 is a microphotograph showing a particulate structure of a test piece having a coating layer formed in accordance with comparative example 15.
Figure 9:
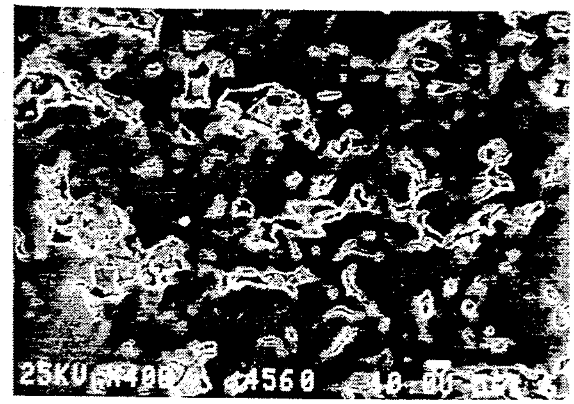
FIG. 9 (Prior Art)
FIG. 9 is a microphotograph showing a particulate structure of a test piece having a coating layer formed in accordance with comparative example 17.
Figure 10:
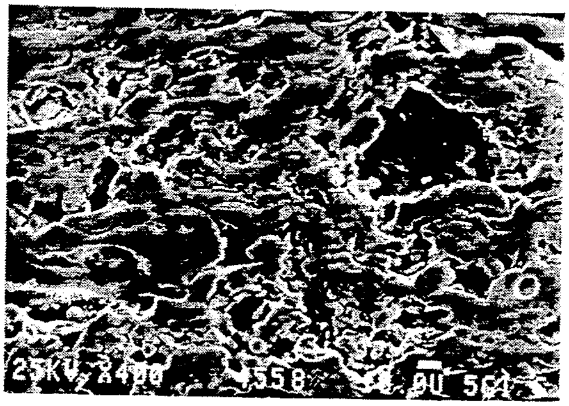
FIG. 10 is a microphotograph showing a particulate structure of a test piece having a coating layer formed in accordance with the fourth preferred embodiment.
Figure 11:
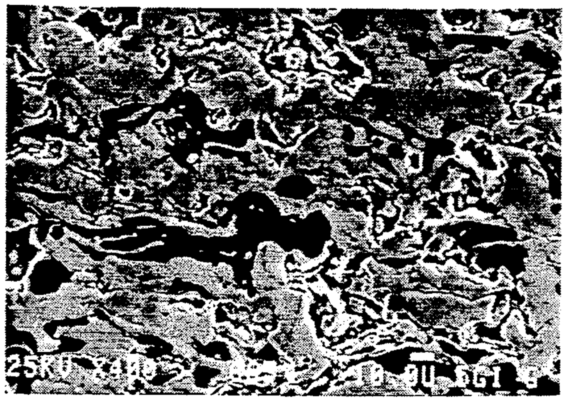
FIG. 11 (Prior Art)
FIG. 11 is a microphotograph showing a particulate structure of a test piece having a coating layer formed in accordance with comparative example 20.

Moreover, a microphotograph (×400) of the coating layer formed on the test piece in accordance with comparative example 15 is shown as FIG. 8, and was taken by a scanning electron microscope (hereinafter referred to as "SEM"). Likewise, microphotographs (×400, taken by the SEM) of the coating layers formed on the test piece in accordance with comparative example 17, the fourth preferred embodiment and comparative example 20 are shown as FIG. 9, 10 and 11, respectively. It is understood that the coating layers formed on the test pieces in accordance with the fourth and fifth preferred embodiment had structures in which the BN was present, thereby giving low hardnesses and favorable machinabilities. Namely, the coating layers including the BN were easily machined. This is believed to result from the fact that the BN had low wettability with the oxides therearound because it was not oxide, and that the force for binding the particles were weak because the BN was so soft that it had a Mohs scale of 1 to 2. On the other hand, it is apparent from FIG. 9 that substantially no graphite was present in the coating layer formed on the test piece in accordance with comparative example 17. This is because the graphite was burned up during the plasma jet flame coating. As for the coating layer formed on the test piece in accordance with comparative example 19 or 20, it seems from FIG. 11 that the coating layer was formed firmly. This is believed to result from the fact that the mica included therein had good wettability because the mica mainly consisted of $SiO_2$ and $Al_2O_3$ which were oxides similar to the aluminum oxide compounded together with the mica in the abradable material, and that the mica itself was harder than the BN. Therefore, it seems that the coating layer including the mica and formed on the test piece in accordance with comparative example 19 or 20 was harder than those of the test pieces of the other comparative examples, and that it had bad machinability.

(2) Evaluation on Optimum BN Addition Amount

An optimum BN addition amount was evaluated in view of the machinability and the thermal shock resistance.

(2)-(a) Machinability Test for Evaluating BN Addition Amount Influence on Machinability The coating layers of the fourth and fifth preferred embodiment were formed on the test pieces in the same manner as aforementioned, however the addition amounts of the $ZrO_2.8Y_2O_3$ and the $Al_2O_3$ were varied in a range of 50 to 90% by volume and the addition amount of the BN was varied in a range of 10 to 50% by volume. The test pieces thus prepared were subjected to the machinability test described in section (1) above, and their machined depths (mm) and ring wear amounts (mg) were measured similarly. The results of the test are illustrated in FIG. 12.

Figure 12:
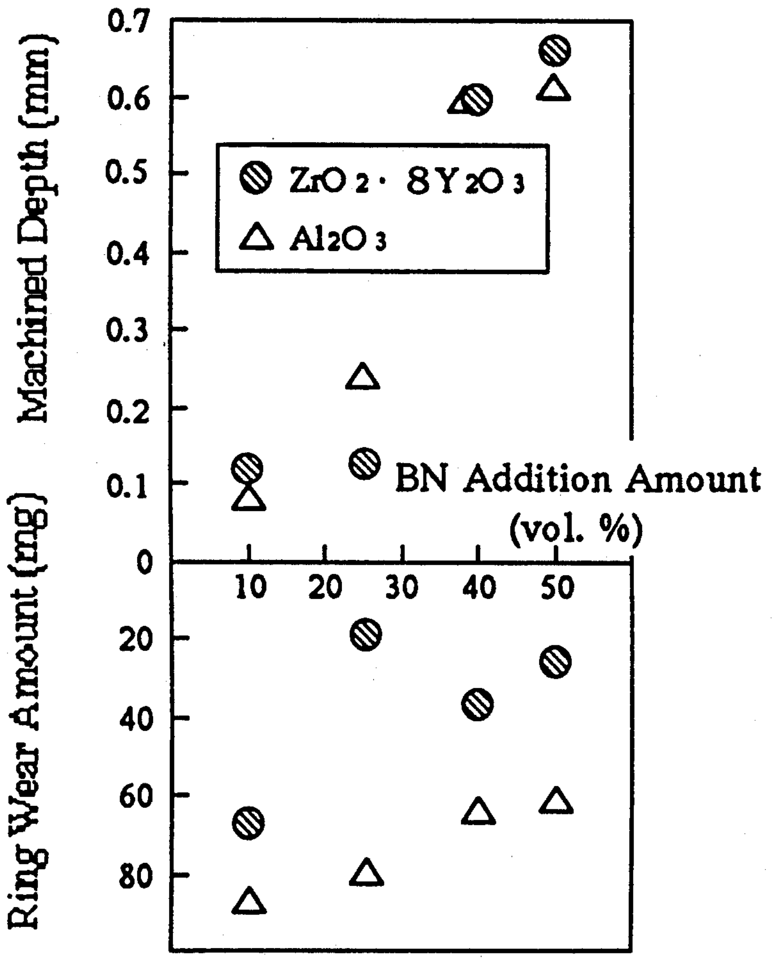
FIG. 12 is a scatter diagram illustrating relationships among machined depths, wear amounts and addition amounts of the BN of the fourth and fifth preferred embodiment.

The following is understood from FIG. 12: In the coating layer including the $ZrO_2.8Y_2O_3$ and also in the coating layer including the $Al_2O_3$, the more the BN addition amount increases, the more the machinability becomes favorable. Accordingly, it is preferable to add the BN more in consideration of the machinability only.

(2)-(b) Thermal Shock Test for Evaluating BN Addition Amount Influence on Thermal Shock Resistance The thermal shock resistance of the coating layer including the BN was evaluated by a thermal shock test, i.e., a thermal cycle test. At first, the coating layers of the fourth and fifth preferred embodiment were formed on the test pieces in the same manner as aforementioned, however the addition amounts of the $ZrO_2.8Y_2O_3$ and the $Al_2O_3$ were varied in a range of 50 to 100% by volume and the addition amount of the BN was varied in a range of 0 to 50% by volume. The test pieces thus prepared were subjected to a thermal cycle test. One cycle of the test consisted of a first step of heating the test pieces with an oxygen-acetylene burner to approximately 1000° C. in 32 seconds and a second step of quenching the test pieces by immersing them into water. The cycle was carried out repeatedly until part of or whole of the coating layers came off or fell off. The thermal shock resistance of the test pieces were rated by the number of the repeated cycles until the coming off or falling off. Here, checking was done every 50 cycles, and the cycle was repeated up to a maximum of 2000 times. The results of the test are illustrated in FIG. 13.

Figure 13:
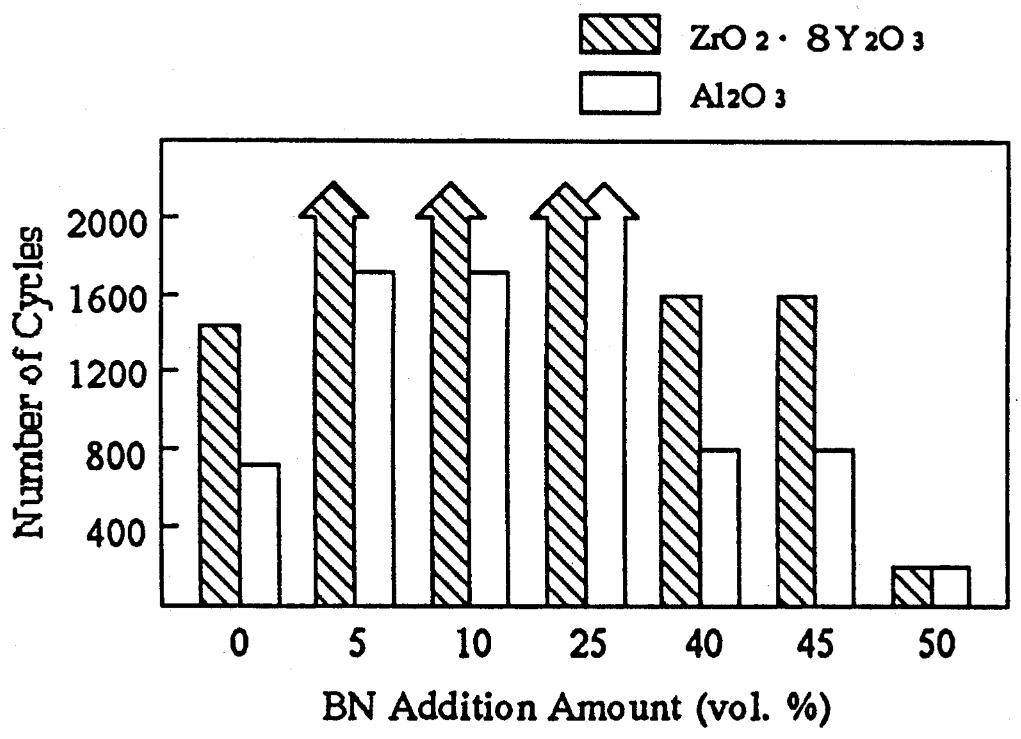
FIG. 13 is a column chart illustrating thermal shock resistance or number of endured thermal cycles exhibited by the fourth and fifth preferred embodiment.

As can be seen from FIG. 13, the thermal shock resistance began to improve starting at the BN addition amount of 5% by volume, marked the maximum improvement at the BN addition of 25% by volume, and deteriorated starting at the BN addition amount of 45% by volume. In addition, the coating layers come off at less than 200 cycles when the BN addition amount was 50% by volume.

According to the results of the machinability test in section (2)-(a) and the thermal shock test in section (2)-(b) as illustrated in FIGS. 12 and 13, it is verified that an effective coating layer in respect of the machinability and the thermal shock resistance can be formed when the BN addition amount falls in a range of 5 to 45% by volume. Further, it is believed that the $ZrO_2.8Y_2O_3$ is a more preferable oxide to be included in the coating layer than the $Al_2O_3$ is.

Additional Evaluation No. 1

The coating layers including the BN formed in accordance with the fourth and fifth preferred embodiment were compared with the porous coating layer formed in accordance with the U.S. Pat. No. 4,269,903 with regard to their machinabilities and thermal shock resistances.

Figure 14:
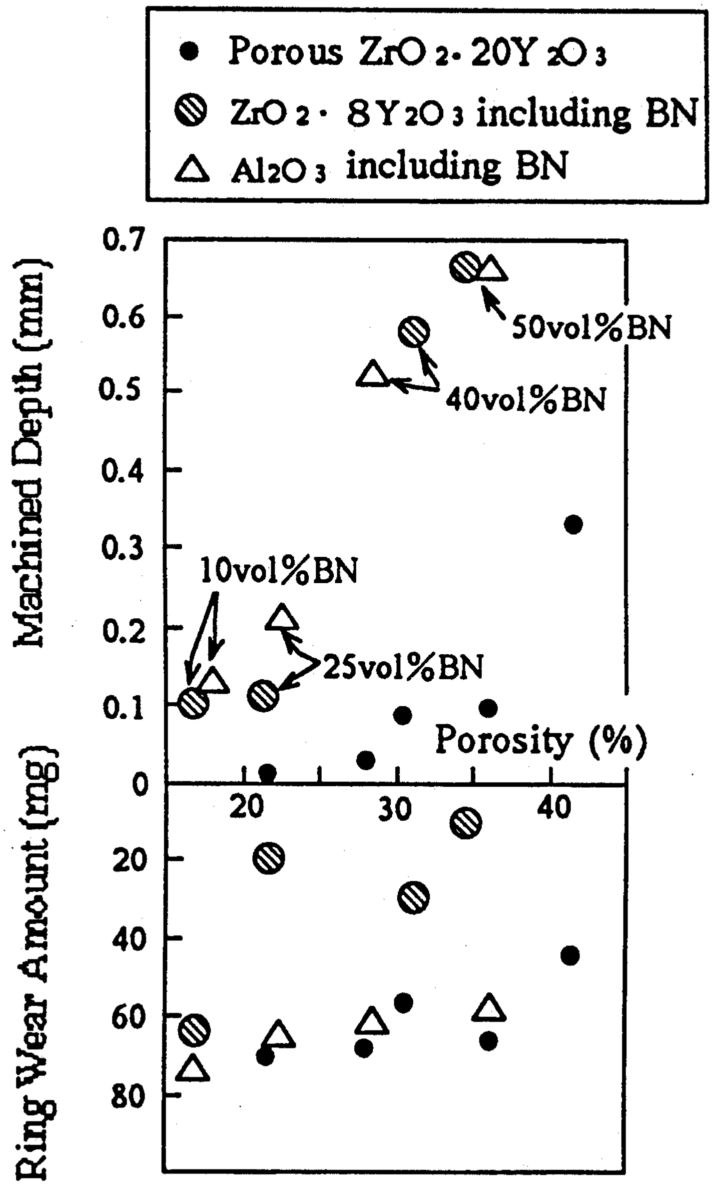
FIG. 14 is a scatter diagram illustrating relationships among machined depths, wear amounts and porosities of the fourth and fifth preferred embodiment as well as another comparative example.

The coating layers of the fourth and fifth preferred embodiment were formed on the test pieces in the same manner as aforementioned, however the addition amounts of the $ZrO_28.Y_2O_3$ and the $Al_2O_3$ were varied in a range of 50 to 90% by volume and the addition amount of the BN was varied in a range of 10 to 50% by volume. Further, a coating layer was formed on test pieces in accordance with the U.S. Pat. No. 4,269,903, and the coating layer included porous $ZrO_2.20Y_2O_3$ and had a porosity of 20 to 33%. The test pieces thus prepared were subjected to the machinability test described in section (1) above, and their machined depths (mm) and ring wear amounts (mg) were measured similarly. The results of the test are illustrated in FIG. 14. In FIG. 14, the machined depths and the ring wear amounts are plotted with respect to the same horizontal axis specifying the porosity of the coating layers of the test pieces in percentage.

As can be seen from FIG. 14, the coating layers formed in accordance with the fourth and fifth preferred embodiment exhibited more favorable machinabilities than the coating layers formed in accordance with the U.S. Pat. No. 4,269,903 did at identical porosities. This is believed to result from the fact that the BN particles having the softness and disposed in the laminated structure were present on the boundaries of the oxides such as zirconium oxide and the like.

Further, the test pieces were subjected to the thermal shock test described in section (2)-(b) above, and their thermal shock resistances were evaluated similarly. The results of the test are illustrated in FIG. 15.

Figure 15:
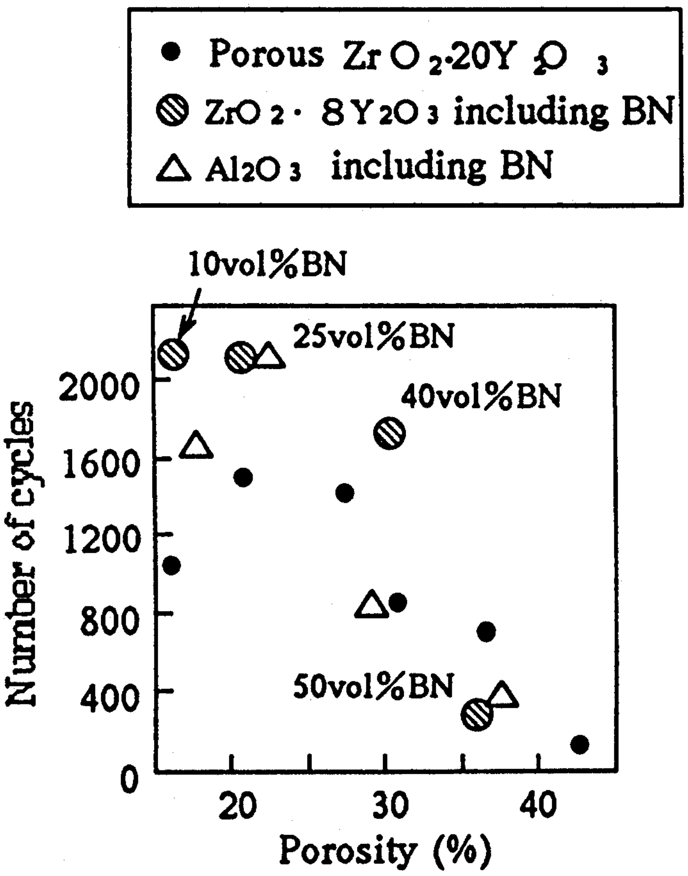
FIG. 15 is a scatter diagram illustrating relationships between number of endured thermal cycles and porosities exhibited by the fourth and fifth preferred embodiment as well as a still another comparative example.

As can be seen from FIG. 15, the coating layers including the BN exhibited better thermal shock resistances than the coating layers free from the BN in a porosity range of 20 to 33%. Although the coating layers free from the BN exhibited increased machinability in a porosity range of over 40% according to FIG. 14, the thermal shock resistance deteriorated so sharply that the coating layers free from the BN were hardly applicable to a practical use as can be seen from FIG. 15. Accordingly, the coating layers including the BN formed in accordance with the present invention were superior to the conventional porous coating layers in respect of the machinability and the thermal shock resistance.

Additional Evaluation No. 2

The coating layers including the BN formed in accordance with the fourth and fifth preferred embodiment were compared with the metallic coating layer mainly composed of nickel and disclosed in the Japanese Unexamined Patent Publication No. 18085/1974 and the U.S. Pat. No. 4,405,284 with regard to their corrosion resistances.

The coating layers of the fourth and fifth preferred embodiment were formed on the test pieces in the same manner as aforementioned, however the addition amounts of the $ZrO_2.8Y_2O_3$ and the $Al_2O_3$ were set at 75% by volume, and the addition amount of the BN was set at 25% by volume. Further, a coating layer including nickel and graphite was formed on the test pieces. Furthermore, a coating layer including NiCrFeAl alloy and the BN was formed on the test pieces. Namely, the coating layer including nickel and graphite was formed of the abradable material according to comparative example 13, and the coating layer including NiCrFeAl alloy and the BN was formed of the abradable material according to comparative example 14.

The test pieces thus prepared were subjected to a corrosion resistance test. The corrosion resistance test was carried out in the following procedure: First, the test pieces were put in an oven whose temperature is held at 1000° C. Then, the test pieces weighed from time to time to check their weight variations in mg, thereby evaluating their degrees of the oxidation. The results of the test are illustrated in FIG. 16.

Figure 16:
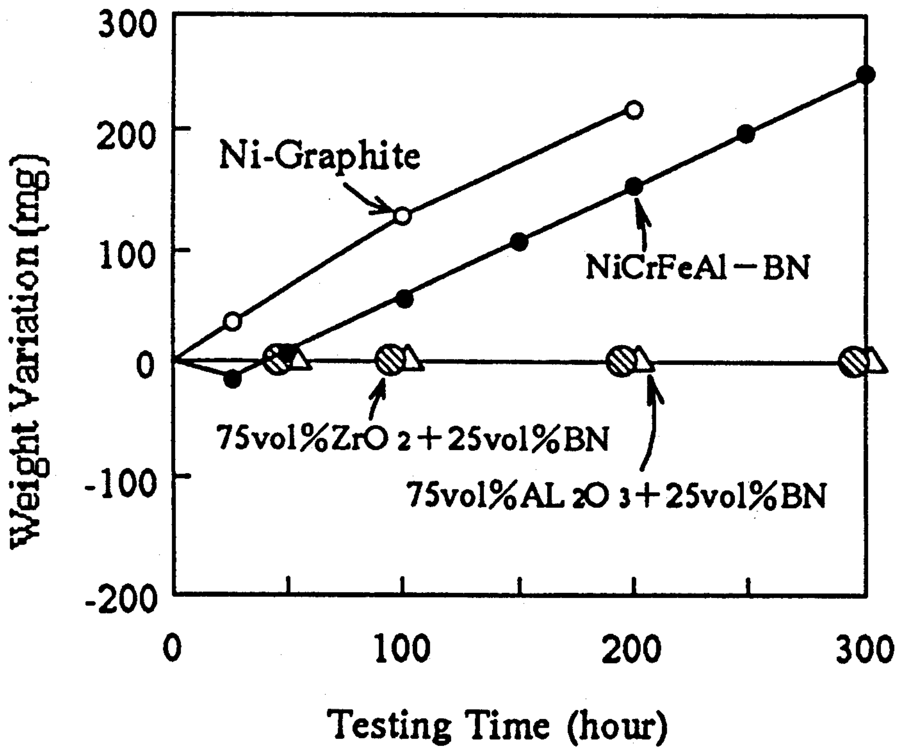
FIG. 16 is a line chart illustrating relationships between weight variations and testing times exhibited by the fourth and fifth preferred embodiment as well as a still another comparative examples.
Figure 17:
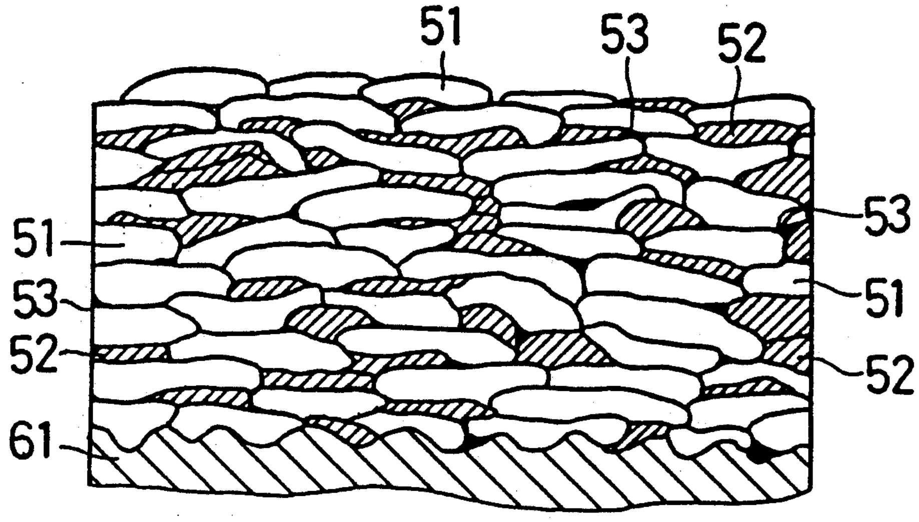
FIG. 17 is a schematic cross sectional view for illustrating how a coating layer of the present invention works.
Figure 18:
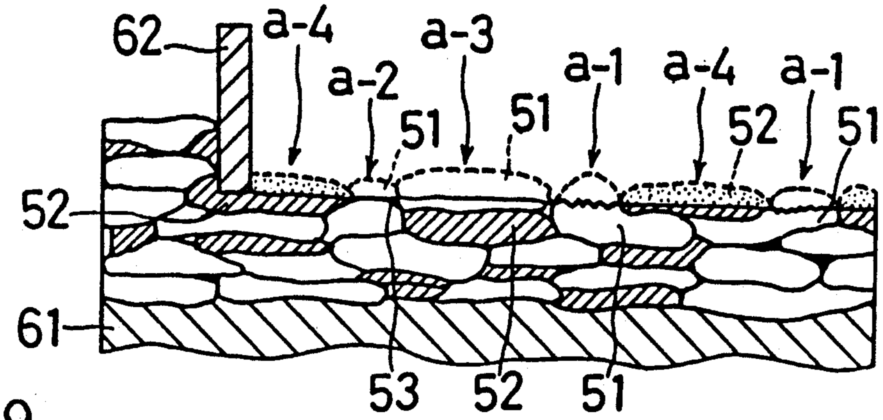
FIG. 18 is another schematic cross sectional view for illustrating how the coating layer thereof works.
Figure 19:
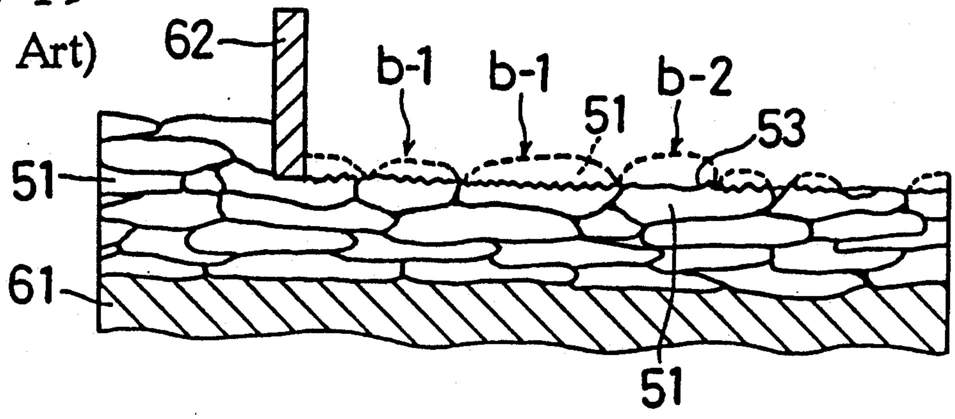
FIG. 19 (Prior Art)
FIG. 19 is a schematic cross sectional view for illustrating how a conventional coating layer works.

As can be seen from FIG. 16, the test pieces having the coating layers including the oxides and the BN showed no weight variation even at a high temperature of 1000° C., and no failure resulting from the oxidation and the like occurred therein. On the other hand, the test pieces having the conventional nickel-base coating layers gained their weights as time passed because the oxidation developed therein. Accordingly, the coating layers including the BN formed in accordance with the present invention were much better than the conventional nickel-base coating layers in respect of the corrosion resistance.

Sixth Preferred Embodiment

A turbocharger of a sixth preferred embodiment according to the present invention was manufactured in the same manner as the turbocharger of the first preferred embodiment except that a ceric oxide ($CeO_2$) powder was employed for preparing an abradable material in the step (d) of the procedure for manufacturing the turbocharger. The ceric oxide powder had an average particle size of 10 to 74 μm and was produced by Showa Denko Co., Ltd. The turbocharger of the sixth preferred embodiment thus manufactured had a coating layer 85 having a porosity of 23%.

Seventh Preferred Embodiment

The turbocharger of a seventh preferred embodiment was identical with that of the first preferred embodiment except that an abradable material was employed which included 75% by volume of an ceric oxide powder and 25% by volume of a $ZrO_2.20Y_2O_3$ powder. Here, the $ZrO_2.20Y_2O_3$ powder (produced by Showa Denko Co., Ltd.) had an average particle size of 10 to 44 μm, and the ceric oxide powder was identical with the one employed in the sixth preferred embodiment. The turbocharger of the seventh preferred embodiment thus manufactured had a coating layer 85 having a porosity of 21%.

Eighth Preferred Embodiment

The turbocharger of an eighth preferred embodiment was identical with that of the first preferred embodiment except that an abradable material was employed which included 30% by volume of a ceric oxide powder and 70% by volume of a $ZrO_2.20Y_2O_3$ powder. Here, the $ZrO_2.20Y_2O_3$ powder was identical with the one employed in the seventh preferred embodiment, and the ceric oxide is the one employed in the sixth preferred embodiment. The turbocharger of the eighth preferred embodiment thus manufactured had a coating layer 85 having a porosity of 19%.

Comparative Example 21

The turbocharger of comparative example 21 was identical with that of the first preferred embodiment except that an abradable material was employed which included 100% by volume of $ZrO_2.20Y_2O_3$ powder. Here, the $ZrO_2.20Y_2O_3$ powder was identical with the one employed in the seventh preferred embodiment. The turbocharger of the comparative example 21 thus manufactured had a coating layer having a porosity of 30%.

Comparative Example 22

The turbocharger of comparative example 22 was identical with that of the first preferred embodiment except that an abradable material was employed which included 100% by volume of an $Al_2O_3$ powder. Here, the $Al_2O_3$ powder was produced by Metco Co., Ltd., and had an average particle size of 35 to 74 μm. The turbocharger of the comparative example 22 thus manufactured had a coating layer having a porosity of 28%.

Product Evaluation

The turbochargers of the sixth, seventh and eighth preferred embodiment as well as comparative example 21 and 22 were subjected to the above-mentioned 300-hour durability test simulating an actual operation for evaluating the noise during the 300 hour-operation, the coating layer state after the operation and the turborotor state after the operation. The weight reductions (in grams) of the turborotors 82 were also measured after the operation. The results of the tests are set forth in Table 5. Likewise, in accordance with the results of the test, the turbochargers were rated in a "Total Evaluation" column of Table 5 with either a "Good" sign identifying an excellent turbocharger and a "Bad" sign identifying an inferior turbocharger.

TABLE 5

| Turbo-charger | Noise during Oper. | Coating Layer State after Operation | Turborotor State after Operation | | Total Evaluation |
|---|---|---|---|---|---|
| | | | Deform. | Wt. Reduc. | |
| 6th Pref. | None | No Problem | None | None | Good |
| 7th Pref. | None | No Problem | None | None | Good |
| 8th Pref. | Low | No Problem | None | None | Good |
| Com. 21 | Loud | Come-off in Part of Machined Surface | Heavy | 4 grams | Bad |
| Com. 22 | Max. | Come-off Coating | Heavy, Cracks in Blades | 12 grams | Bad |

As set forth in Table 5, the turbochargers of the sixth and seventh preferred embodiment did not show any faulty operation such as chattering, coming off or falling off of the coating layer 85, damaged turborotor 82, because the coating layer 85 of the turbohousing 81 was easily machined by the turborotor 82 and the generated surface 851 is thereby generated on the coating layer 85 as illustrated in FIG. 4 even in the case that the turborotor 82 was brought into contact with or collided with the turbohousing 81 during the operation. Additionally, the turbocharger of the eighth preferred embodiment showed any particular problem other than that it generated a bit of low chattering.

On the other hand, the turbochargers of comparative examples 21 and 22 generated loud chattering when the turborotors 82 were brought into contact with the turbohousings 81 in the operation because the coating layers were of inferior machinability. As for the state of the coating layer after the operation, the coating layer of the turbocharger of comparative example 21 was not machined, but it came off when the turborotor 82 was brought into contact with the turbohousing 81 in the operation. Moreover, the turbocharger of comparative example 21 had the deformed blades of the turborotor 82, and showed a weight reduction due to wear after the operation. Finally, in the turbocharger of comparative example 22, one third of the coating layer came off because of the poor thermal shock resistance at 950° C., i.e., the maximum temperature to which the turbochargers were applied. Moreover, in the turbocharger of comparative example 22, the blades of the turborotor 82 were deformed and cracked. The deformed and cracked blades are believed to result from the poor machinability of the coating layer and the collisions of the fragments of the come-off coating layer. The turbocharger of comparative example 22 accordingly showed the largest weight reduction or wear amount of 12 grams.

The turbochargers of the sixth and seventh preferred embodiment were also subjected to the product performance test for evaluating the total efficiency (%) under the condition of the rotor speed of a hundred thousand rpm. The turbochargers of the sixth and seventh preferred embodiment had the total efficiency improved by 5.3 and 5.1% respectively with respect to the turbocharger without the coating layer which had the total efficiency of 51%. It is believed that the generated surface 851 made the clearance between the turbohousing 81 and the turborotor 82 zero (0) substantially as illustrated in FIG. 4 and accordingly the gas leakage could be suppressed to a minimum degree, thereby making the improvement possible.

Therefore, in the turbochargers of the sixth, seventh and eighth preferred embodiment having the coating layer 85 which included the ceric oxide, the turborotors 82 could be prevented from being damaged, and the efficiency of the turbochargers could be improved.

Ninth through Thirteenth Preferred Embodiment

The present invention will be hereinafter described with reference to the results of the above-mentioned tests for evaluating the test pieces having coating layers formed in accordance with a ninth through thirteenth preferred embodiment.

(1) Machinability Test

Abradable materials were prepared whose compositions are set forth in Table 6. Then, coating layers were formed of the abradable materials of the ninth through thirteenth preferred embodiment as well as comparative examples 23 through 30 in the same manner as described in section (1) of Fourth and Fifth Preferred Embodiment. Here, the BN powder ("UHP-EX" produced by Showa Denko Co., Ltd.) had an average particle size of 35 to 45 μm, and the $CeO_2$ powder, the $Al_2O_3$ powder and he $ZrO_2.20Y_2O_3$ powder were identical with those employed by the sixth through seventh preferred embodiment or the comparative examples 21 and 22.

TABLE 6

| Test Piece | Abradable Material Composition |
|---|---|
| 9th Pref. Embodi. | $CeO_2$ |
| 10th Pref. Embodi. | 75 vol. % $CeO_2$ + 25 vol. % BN |
| 11th Pref. Embodi. | 60 vol. % $CeO_2$ + 40 vol. % BN |
| 12th Pref. Embodi. | 75 vol. % $CeO_2$ + 25 vol. % $Al_2O_3$ |
| 13th Pref. Embodi. | 75 vol. % $CeO_2$ + 25 vol. % $ZrO_2.20Y_2O_3$ |
| Com. Ex. 23 | $ZrO_2.20Y_2O_3$ (Porosity: 15%) |
| Com. Ex. 24 | $ZrO_2.20Y_2O_3$ (Porosity: 30%) |
| Com. Ex. 25 | 75 vol. % $ZrO_2.20Y_2O_3$ + 25 vol. % BN |
| Com. Ex. 26 | 60 vol. % $ZrO_2.20Y_2O_3$ + 40 vol. % BN |
| Com. Ex. 27 | $Al_2O_3$ (Porosity: 15%) |
| Com. Ex. 28 | 75 vol. % $Al_2O_3$ + 25 vol. % BN |
| Com. Ex. 29 | 60 vol. % $Al_2O_3$ + 40 vol. % BN |
| Com. Ex. 30 | 35 vol. % $ZrO_2.20Y_2O_3$ + 25 vol. % $Al_2O_3$ + 40 vol. % BN |

The test pieces thus prepared were subjected to the machinability test for comparing their machinabilities described in section (1) of Fourth and Fifth Preferred Embodiment. The results of the machinability test are illustrated in FIG. 20.

Figure 20:
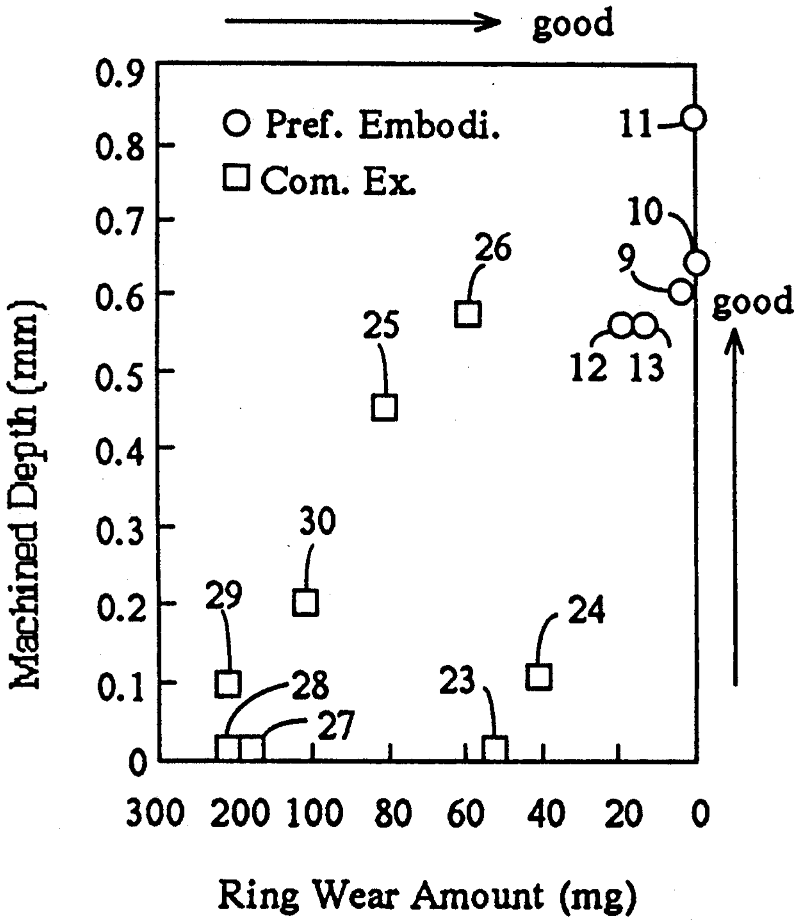
FIG. 20 is a scatter diagram illustrating relationships between wear amounts and machined depths of a ninth through thirteenth preferred embodiment as well as comparative examples 23 through 30.

It is understood from FIG. 20 that the coating layers including the ceric oxide and formed in accordance with the ninth through thirteenth preferred embodiment were machined easily and that they were favorable. It is especially apparent when the characteristics of the coating layers of the ninth through thirteenth are compared with those of the coating layer including $ZrO_2.20Y_2O_3$ of a large porosity and formed in accordance with the comparative example 24 and the coating layer formed in accordance with the comparative example 27 which has been employed in an aircraft conventionally.

Further, when the coating layers of the comparative examples 23 and 24 are compared with the coating layers of the comparative examples 25 and 26, the machinabilites of the $ZrO_2.20Y_2O_3$-base coating layers were improved by adding the BN. However, since these coating layers had slightly strong mating part attacking tendencies or slightly large ring wear amounts, they were a bit inadequate for an abradable material for adjusting the clearance in a relatively displacing apparatus. On the other hand, it was found that the $CeO_2$-base coating layers of the ninth through thirteenth preferred embodiment could have weak mating part attacking tendencies and excellent machinabilities even when the auxiliary powder such as the BN and the like was not added therein.

(2) Vickers Hardness Measurement

Figure 21:
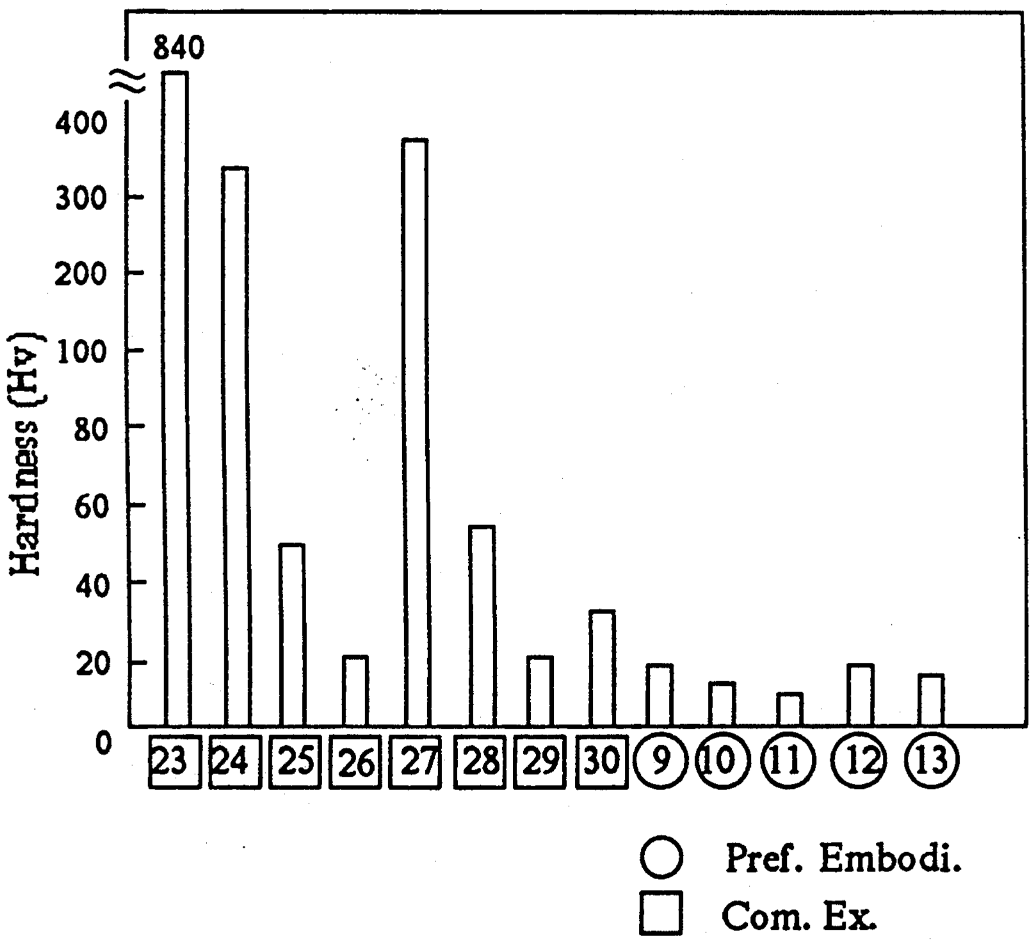
FIG. 21 is a column chart illustrating hardnesses of the ninth through thirteenth preferred embodiment as well as comparative examples 23 through 30.

The abradable materials set forth in Table 6 were coated on the test pieces by plasma jet flame spray coating in the same manner as described in section (1) of Fourth and Fifth Preferred Embodiment. Then, the Vickers hardnesses of the coating layers were measured. FIG. 21 illustrates the results of the measurement.

It is assumed from FIG. 21 that the coating layers of the ninth through thirteenth embodiment were much softer and much more machinable than the coating layers of the comparative examples 23 to 30. In addition, when comparing the hardness of the coating layer of the ninth preferred embodiment with those of the coating layers of the tenth and eleventh preferred embodiment, it was found that the machinability was further improved by adding the BN.

(3) Evaluation on Optimum Ceric Oxide Addition Amount

Since the coating layer formed by flame spray coating the ceric oxide had a favorable machinability, an optimum ceric oxide addition amount was evaluated in view of the machinability and the thermal shock resistance.

(3)-(a) Machinability Test for Evaluating Ceric Oxide Addition Amount Influence on Machinability The coating layers of the thirteenth preferred embodiment were formed on the test pieces in the same manner as aforementioned, however the addition amounts of the ceric oxide and the $ZrO_2.20Y_2O_3$ were vaired variously in a range of 0 to 100% by volume. Here, the $ZrO_2.20Y_2O_3$ and the ceric oxide were identical with the above-mentioned ones. The test pieces thus prepared were subjected to the machinability test described in section (1) of Fourth and Fifth Preferred, and their machined depths (mm) and ring wear amounts (mg) were measured similarly. The results of the test are illustrated in FIG. 22.

Figure 22:
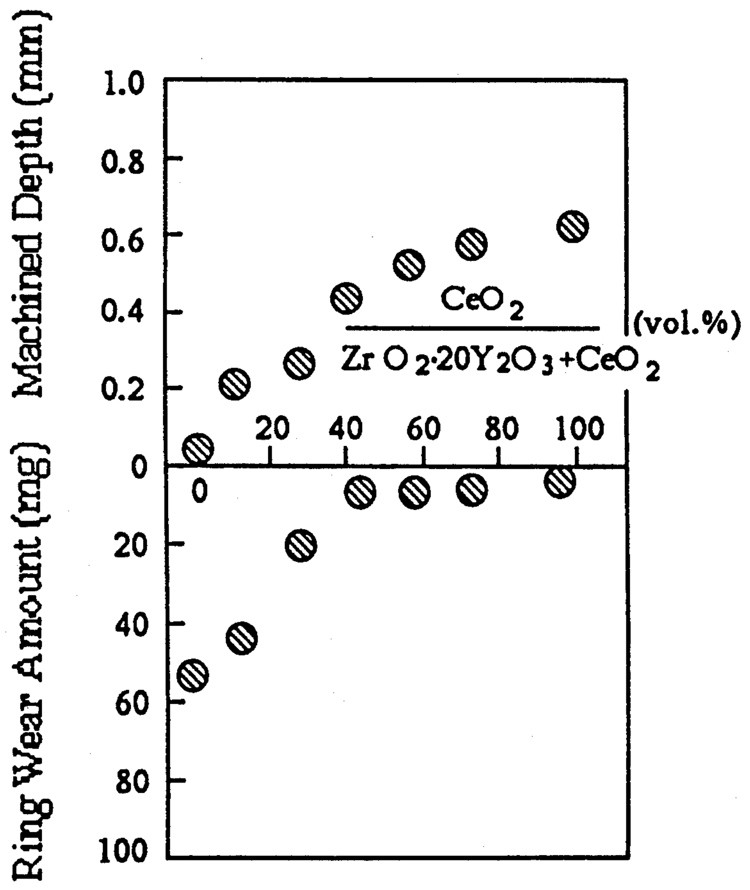
FIG. 22 is a scatter diagram illustrating relationships among machined depths, wear amounts and addition amounts of the ceric oxide of the thirteenth preferred embodiment.

It is understood from FIG. 22 that the coating layer came to have more favorable machinability as the ceric oxide was added more in the abradable material. When the ceric oxide was added by 10% by volume, the machinability, i.e., the machined depth of the coating layer, deteriorated substantially as low as that of the coating layer of the comparative example 24 (See FIG. 20.). The coating layer of the comparative example 24 was formed in accordance with the U.S. Pat. No. 4,269,903. Further, when the ceric oxide was added by less than 10% by volume, the machinability of the coating layer decreased sharply. Consequently, it is necessary to include the ceric oxide by 10% by volume or more in order to obtain a coating layer of a favorable machinability.

(3)-(b) Thermal Shock Test for Evaluating Ceric Oxide Addition Amount Influence on Thermal Shock Resistance The thermal shock resistance of the coating layer including the ceric oxide was evaluated by the thermal shock test described in section (2)-(b) of Fourth and Fifth Preferred Embodiment. At first, the coating layers of the twelfth and thirteenth preferred embodiment were formed on the test pieces in the same manner as aforementioned, however, in the coating layers of this thirteenth preferred embodiment, $ZrO_2.8Y_2O_3$ was used instead of the $ZrO_2.20Y_2O_3$, and the addition amount of the ceric oxide with respect to the $ZrO_2.8Y_2O_3$ or the $Al_2O_3$ was varied variously in a range of 0 to 100% by volume. Further, comparative test pieces were prepared on which the abradable materials of the comparative examples 24 and 27 were coated by plasma jet flame spray coating. Also in this test, the alloy including the NiCrAl alloy was coated by plasma jet flame spray coating in a thickness of 1 mm before flame coating the abradable materials. Here, the $ZrO_2.8Y_2O_3$ powder ("K90" produced by Showa Denko Co., Ltd.) had an average particle size of 10 to 74 μm, and the $Al_2O_3$ and the ceric oxide were identical with the above-mentioned ones. The test pieces thus prepared were subjected to the thermal cycle test. The results of the test are illustrated in FIG. 23.

Figure 23:
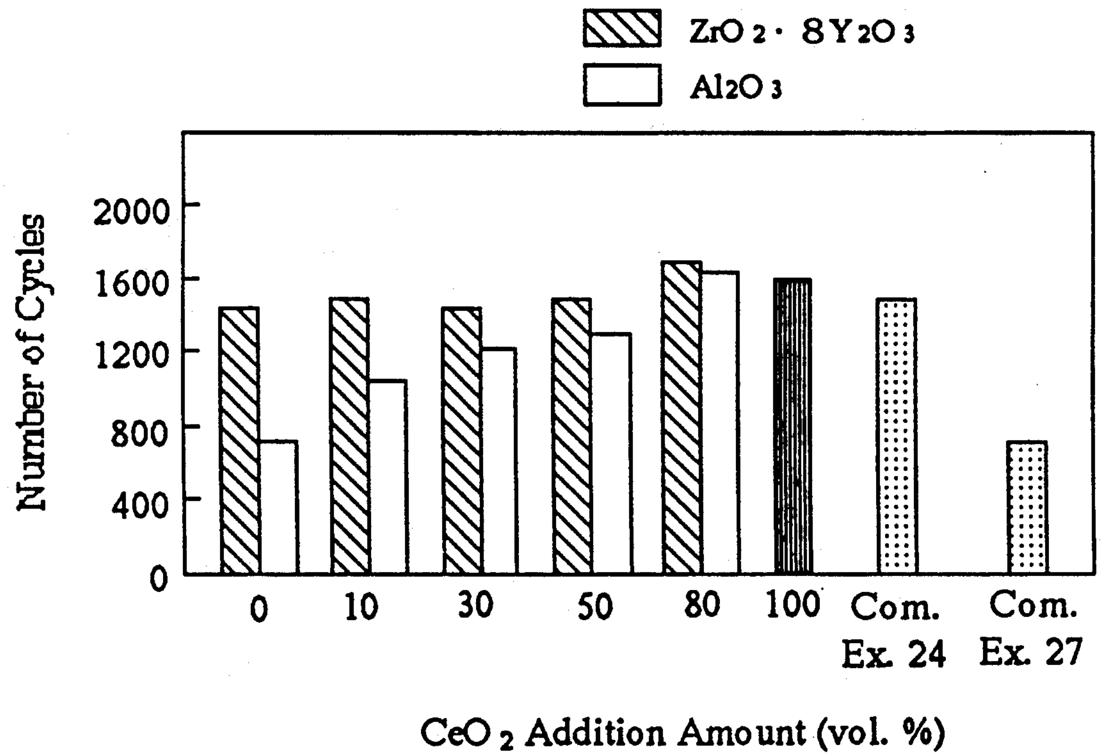
FIG. 23 is a column chart illustrating thermal shock resistance or number of endured thermal cycles exhibited by the twelfth and thirteenth preferred embodiment as well as comparative examples 24 and 27.

As can be seen from FIG. 23, the thermal shock resistances of the coating layers of the preferred embodiments were substantially equivalent to those of the comparative examples 24 and 27. However, when the ceric oxide was included by 10% by volume or more, the thermal shock resistances of the coating layers of the preferred embodiments improved to equivalent to or more than those of the coating layers of the comparative examples 24 and 27. Additionally, it was found that the $ZrO_2.8Y_2O_3$ was superior to the $Al_2O_3$ as the oxide to be included in the coating layer in respect of the thermal shock resistance.

According to the results of the machinability test in section (3)-(a) and the thermal shock test in section (3)-(b) as illustrated in FIGS. 22 and 23, it is verified that an effective coating layer in respect of the machinability and the thermal shock resistance can be formed when the ceric oxide addition amount falls in a range of 10% by volume or more. Therefore, in consideration of the results of the tests described in sections (1), (2) and (3) above, it can be said that the abradable material including the ceric oxide by 10% by volume or more is an optimum flame spray coating material for adjusting the clearance in the relatively displacing apparatus.

Having now fully described the present invention, it will be apparent to one of ordinary skill in the art that many changes and modifications can be made thereto without departing from the spirit or scope of the invention as set forth herein.

What is claimed is:

1. A relatively displacing apparatus comprising:
a movable member; and
a stationary member;
said movable member and said stationary member disposed adjacent to each other and displacing relatively at a high temperature;
said stationary member having a coating layer disposed adjacent to said movable member, said coating layer being formed by flame spray coating, including hexagonal system boron nitride and having a surface generated by machining with said movable member.

2. The relatively displacing apparatus according to claim 1, wherein said coating layer includes said boron nitride by 5 to 45% by volume.

3. The relatively displacing apparatus according to claim 1, wherein said boron nitride has an average particle size of 5 to 50 μm.

4. The relatively displacing apparatus according to claim 1, wherein said coating layer includes said ceric oxide by 10% by volume or more.

5. The relatively displacing apparatus according to claim 1, wherein said ceric oxide has average particle size of 10 to 100 μm.

6. The relatively displacing apparatus according to claim 1, wherein said coating layer further includes at least one oxide selected from the group consisting of zirconium oxide, yttrium oxide and aluminum oxide.

7. The relatively displacing apparatus according to claim 6, wherein said oxide has an average particle size of 10 to 100 μm.

8. A relatively displacing apparatus comprising:
a movable member; and
a stationary member;
said movable member and said stationary member disposed adjacent to each other and displacing relatively at a high temperature;
said stationary member having a coating layer disposed adjacent to said movable member, said coating layer being formed by flame spray coating, including ceric oxide and having a surface generated by machining with said movable member.

9. The relatively displacing apparatus according to claim 8, wherein said coating layer further includes at least one oxide selected from the group consisting of zirconium oxide, yttrium oxide and aluminum oxide.

10. The relatively displacing apparatus according to claim 9, wherein said one oxide has an average particle size 10 to 100 μm.

11. The relatively displacing apparatus according to claim 8, further including an adhesion-improving alloy layer on said stationary member, said coating layer being formed in said alloy layer.

12. The relatively displacing apparatus according to claim 1, further including an adhesion-improving alloy layer on said stationary member, said coating layer being formed in said alloy layer.

* * * * *

UNITED STATES PATENT AND TRADEMARK OFFICE

CERTIFICATE OF CORRECTION

PATENT NO. : 5,185,217

DATED : February 9, 1993

INVENTOR(S) : Noritaka Miyamoto, et al

It is certified that error appears in the above-indentified patent and that said Letters Patent is hereby corrected as shown below:

Claim 4, column 20, line 48, "claim 1" should read --claim 8--.

Claim 5, column 20, line 51, "claim 1" should read --claim 8--.

Note: Claims 4 and 5 were amended to depend from from claim 8 and are thus positioned incorrectly. These claims should appear after claim 8.

Signed and Sealed this

Nineteenth Day of April, 1994

Attest:

BRUCE LEHMAN

*Attesting Officer*

*Commissioner of Patents and Trademarks*